United States Patent [19]

Wilson

[11] Patent Number: 5,052,486
[45] Date of Patent: Oct. 1, 1991

[54] METHOD AND APPARATUS FOR RAPID AND CONTINUOUS HYDRATION OF POLYMER-BASED FRACTURING FLUIDS

[75] Inventor: James C. Wilson, Denver, Colo.

[73] Assignee: Smith Energy Services, Chicago, Ill.

[21] Appl. No.: 405,210

[22] Filed: Sep. 8, 1989

[51] Int. Cl.$^5$ .................... E21B 43/267; E21B 47/06
[52] U.S. Cl. .................................. 166/250; 166/177; 166/308; 252/8.551; 366/136
[58] Field of Search ................. 166/75.1, 79, 64, 66, 166/177, 280, 308, 250; 252/8.551; 366/136, 137, 159, 336, 341

[56] References Cited

U.S. PATENT DOCUMENTS

| | | | |
|---|---|---|---|
| 3,741,533 | 6/1973 | Winn, Jr. | 366/136 X |
| 4,233,265 | 11/1980 | Gasper | 366/341 X |
| 4,482,704 | 11/1984 | Luetzelschwab | 366/136 X |
| 4,506,986 | 3/1985 | Freeman | 366/341 X |
| 4,538,221 | 8/1985 | Crain et al. | 364/172 |
| 4,538,222 | 8/1985 | Crain et al. | 364/172 |
| 4,605,689 | 8/1986 | Witheford | 166/75.1 X |
| 4,635,727 | 1/1987 | Anderson et al. | 166/308 |
| 4,664,528 | 5/1987 | Rodgers et al. | 366/137 X |
| 4,716,932 | 1/1988 | Adams, Jr. | 137/566 |
| 4,828,034 | 5/1989 | Constein et al. | 166/308 |
| 4,901,563 | 2/1990 | Pearson | 166/308 X |

Primary Examiner—George A. Suchfield
Attorney, Agent, or Firm—Sheridan, Ross & McIntosh

[57] ABSTRACT

A method and apparatus for continuously and rapidly hydrating a polymer-based fracturing fluid. The invention is based upon the efficient application of high shear energy in order to increase the rate of hydration of the polymer. The invention includes the timing of the application of shear energy, the amount of shear energy applied and the manner in which it is applied. Specifically, the high shear energy is preferably not applied until at least 45 seconds after the mixing of a polymer slurry with a base liquid. Preferably, at least 2 hydraulic horsepower/barrel/minute of shear energy is applied to the mixture. Additionally, the mixture is recycled to maximize the benefits of application of high shear energy.

37 Claims, 1 Drawing Sheet

METHOD AND APPARATUS FOR RAPID AND CONTINUOUS HYDRATION OF POLYMER-BASED FRACTURING FLUIDS

FIELD OF THE INVENTION

The present invention generally relates to fracturing fluids useful for fracturing subterranean formations to facilitate the recovery of resources such as oil and natural gas, and in particular, the present invention relates to a method and apparatus useful for providing the rapid and continuous hydration of polymer-based fracturing fluids.

BACKGROUND OF THE INVENTION

The use of fracturing fluids for well stimulation is well-known. Fracturing fluids are pumped down a well into a subterranean formation under hydraulic pressure until fracture of the formation is achieved. As a result, production of the well can be improved.

Proppants are typically added to the fracturing fluid before injection into the well. The proppants are useful in propping open the fractures produced during the process to maintain channels in the subterranean formation through which oil or other fluids can flow. It is beneficial if the fracturing fluid has a high viscosity, as this permits a large amount of proppant to be carried by the fracturing fluid.

One type of fracturing fluid comprises a polymer and a base liquid, e.g. an aqueous solution. The polymer is combined with the aqueous solution and hydrates, or gels, over a period of time, causing the fluid mixture to become more viscous. Proppants and other desired additives can be mixed with the hydrated, viscous fluid, which is then pumped into a well under hydraulic pressure.

One problem encountered with polymer-based fracturing fluids is the length of time required for hydration. Typically, ten minutes or more are required for the polymer to achieve full hydration, and hence, for the fluid to achieve full viscosity. As a result, large tanks are typically utilized to produce batches of hydrated fracturing fluids at the job site. Wasted fluids often result due to hydrating more polymer than is necessary to complete a particular fracture job.

Therefore, a need has arisen for methods to conduct continuous or "on-the-fly" fracturing fluid hydration. On-the-fly hydration is accomplished by continuously hydrating a sufficient amount of polymer for injecting into the well as required during the fracture job, as opposed to batch hydration, where the entire amount of fluid which is estimated to be necessary is hydrated in one batch prior to the job. On-the-fly fluid hydration provides a number of advantages including: ability to vary the amount of polymer added during the fracture process; losses due to unused fluid left in batch tanks are reduced; disposal costs for unused fluid are reduced; tank cleaning costs are reduced; on-site time is reduced; the need for bactericides and buffers is reduced; job sites are left cleaner since there are fewer spills of fluids and materials; and overall job efficiency and safety is improved by reducing the labor and efforts required by equipment operators prior to the actual pumping of the job.

A previous technique for on-the-fly fracture fluid hydration utilizes chemicals to eliminate the storage tank for holding the fluid during hydration. Anderson et al. U.S. Pat. No. 4,635,727, discloses a method for the formation of a hydrated gel from a guar gum by utilizing cross-linking agents which allow the gel to continue to hydrate in their presence. The disclosed cross-linking agents include zirconium lactate and aluminum chlorohydrate. The gel is pumped into the well before complete hydration is achieved and continues to hydrate in the well until full viscosity is reached. However, it is desirable that hydration be substantially complete before the fluid is pumped into the well in order to permit the addition of large amounts of proppants.

Adams, Jr., U.S. Pat. No. 4,716,932, discloses an apparatus for the gelation of a polymer fracturing fluid. Dry polymer is mixed with water in a storage tank. The mixture is then pumped through a long manifold to achieve hydration. The disclosed manifold is a 115-foot long section of 14-inch diameter pipe. However, a pipe of this size presents even greater cleaning problems and waste disposal problems than a batch tank. In other words, once the fracture job is complete, the fluid remaining in the pipe would require disposal, and the pipe itself would require cleaning.

Constien, et al., U.S. Pat. No. 4,828,034, discloses a method for continuously producing a hydrated fracture fluid from a slurried polymer during the fracturing of a subterranean formation. This method utilizes a high shear pump followed by a plug flow tank followed by another high shear pump and another plug flow tank. It is disclosed that substantially full hydration can be achieved in less than 5 minutes during this operation.

Although the method taught by Constien et al. provides a number of benefits over methods disclosed in the prior art, it also suffers from a number of disadvantages. For example, the high shear pumps employed in the method of Constien et al. are not efficiently located in the process. Also, a separate pump must be employed for each application of shear.

Therefore, it would be advantageous to have a continuous hydration method and apparatus that permitted hydration prior to introduction of the fluid into a well. It would also be advantageous if clean-up after the fracture job could be simplified and left-over fluid could be reduced to a minimum. Additionally, it would be advantageous if a method and apparatus could be provided for producing a continuously-hydrated fracturing fluid in an efficient and rapid manner.

SUMMARY OF THE INVENTION

In accordance with the present invention, a method and apparatus for continuously and rapidly hydrating a polymer contained in a polymer-based fracturing fluid is provided.

A preferred embodiment of the method in accordance with the present invention includes a step of mixing a polymer slurry and a base liquid. The intensity of the initial mixing of the two components does not have to be very high, just enough mixing to disperse the polymer slurry in the base liquid is sufficient. Preferably, the base liquid is an aqueous solution. The polymer slurry and base liquid mixture is introduced into a first compartment. The purpose of this first compartment is to provide an initial time lag between the mixing of the polymer and base liquid and subsequent high shear steps. The mixture flows through the first compartment, preferably in a plug flow manner, and enters a recycle compartment, preferably after a residence time in the first compartment of at least 45 seconds. A first portion of the mixture in the recycle compartment is withdrawn, subjected to high shear and then returned to the recycle compartment. A second portion of the mixture in the recycle compartment is withdrawn, subjected to high shear and introduced into an exit compartment. Substantially fully hydrated fluid can be withdrawn from the exit compartment and employed in a well fracture job. As used herein, the term "substantially fully hydrated fluid" will be understood to mean a fluid which contains a polymer which is at least 90 percent, and preferably 95 percent, hydrated. Preferably additives, e.g. proppants, are introduced into the hydrated fracture fluid prior to its being pumped into the well.

A preferred embodiment of an apparatus for continuously hydrating a polymer-based fracturing fluid is also provided in accordance with the present invention. The apparatus includes a first vessel for containing a polymer slurry and a second vessel for containing a base liquid. A device is provided to combine the polymer slurry with the base liquid to form a mixture. Preferably, the device for mixing the two components includes a pump and an in-line static mixing device. A first compartment for receiving the mixture is also provided. At flow rates employed in the practice of the present invention, the first compartment preferably has a residence time of at least about 45 seconds. A recycle and an exit compartment are also provided. In fluid communication with the recycle compartment is a device for: a) withdrawing fluid from the recycle compartment; b) imparting high shear energy to the fluid; and c) returning the fluid to the recycle compartment. Preferably, this device includes, piping, a centrifugal pump, and an in-line static mixing device, for providing high shear energy to a fluid. Similar devices are also provided for: a) withdrawing a second portion of a fluid from the recycle compartment; b) imparting high shear energy to the fluid; and c) introducing the fluid into the exit compartment. Mechanisms can also be provided for incorporating additives, such as proppants, into the fluid prior to its introduction to a well.

The apparatus of the present invention provides a number of advantages over the prior art. For example, it has been discovered that the application of shear during the initial dispersion of the polymer slurry into the base liquid is a highly inefficient way to increase the rate of hydration. This unexpected discovery is contrary to the teachings of Constien et al. in U.S. Pat. No. 4,828,034. Constien et al. disclose that: "The slow initial increase in viscosity is related to the method of introduction of slurried polymer into the water and the intensity of mixing which is occurring at that point. By introducing the slurry directly into a flow stream (rather than into the top of an open mixing vessel) the dispersion time can be reduced. Intense mixing of the fluid at this time is also very helpful". In other words, according to the teachings of Constien et al., the hydration rate can be increased by applying high shear energy during the initial dispersion. Unexpectedly, the present inventor has discovered that this is not the case. Therefore, in the present invention high shear energy is preferably not applied until the mixture reaches the recycle stage. This provides a more efficient apparatus and method.

Additionally, it has been discovered that recycling the fracturing fluid improves the efficiency and speed of hydration. In this way, the present invention is capable of continuously producing substantially fully hydrated fracturing fluids in as little as 3 minutes or less. This is an important advantage.

DETAILED DESCRIPTION OF THE INVENTION

Figure 1:
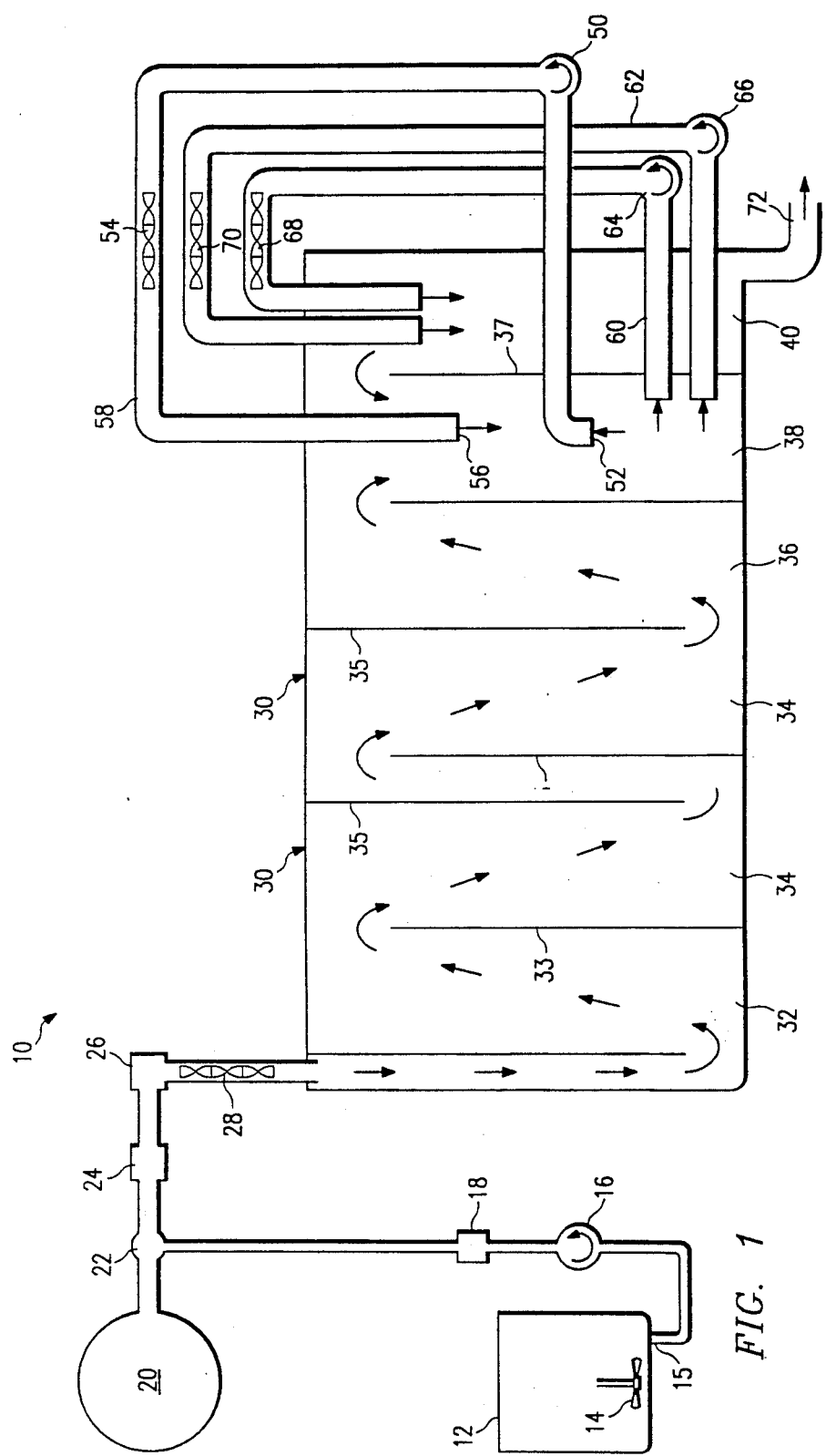
FIG. 1 illustrates a schematic view of a preferred embodiment of an apparatus in accordance with the present invention.

The present invention is directed toward a method and apparatus for the hydration of a polymer dispersed within a base liquid. Rapid, effective hydration is achieved by the timely application of an effective amount of shear energy.

Hydratable polymers are typically used in fracturing fluids due to the large increase in viscosity of the fluid as the polymer hydrates. The rate of hydration is affected by a number of factors. An important factor is the amount of mixing that the polymer/base liquid mixture is subjected to. It was previously thought that in order to increase the hydration rate, one need merely increase the intensity of mixing, i.e., the shear energy to which the mixture is subjected. However, the present inventor has discovered that not only is the amount of shear energy which is applied important, but also the timing of the application and the manner in which the shear energy is applied to the fluid.

The present invention will be described with reference to FIG. 1. A prefered embodiment of the apparatus 10 of the present invention is illustrated in FIG. 1. The apparatus includes a slurry tank 12 having a mixing paddle 14. The slurry tank 12 contains a hydratable polymer dispersed in a liquid phase.

Any of a large number of hydratable polymers known to those skilled in the polymer-based fracturing fluid art are suitable for use in the present invention. Examples of suitable polymers include xanthan gum, guar gum, guar gum derivatives (e.g. hydroxypropyl guar and carboxymethylhydroxypropyl guar), and cellulose derivatives (e.g. hydroxyethylcellulose). Typically, the polymer slurry comprises about 4 pounds of polymer per gallon of liquid. However, this amount will vary with changing conditions such as desired final viscosity, temperature, and pH of the system. Preferably, the temperature of the mixture immediately after mixing is greater than about 55° F. and the pH is from about pH 6.5 to about pH 7.5, and most preferably from about pH 6.8 to about pH 7.2. Viscosity, temperature and pH are preferably monitored continuously and adjusted as necessary.

The liquid phase preferably is diesel oil. However, other hydrocarbons and water-based liquids can be utilized, including but not limited to crude oil, crude oil distillates, vegetable oils, silicone oils, animal oils and treated water. Further, chemical additives can be blended into the polymer slurry. These chemical additives preferably include, but are not limited to, surfactants and suspension agents.

In a preferred embodiment, the polymer slurry tank 12 is 4½ feet×5 feet×8 feet with a volume of about 1,350 gallons. An outlet 15 is provided at or near the bottom of the tank 12. Preferably, the tank 12 is equipped with a device to measure volume (not shown), such as a marked strap on the side to permit visual measurement of the slurry volume. The bottom of the tank 12 can be sloped to aid in the drainage of the polymer slurry to the outlet 15. A baffle (not shown) can also be provided across the tank 12 to prevent fluid shift during transportation of the device 10. To provide ease of transportation, the entire device 10 can be mounted on a truck or trailer.

An entry port (not shown), for example a 16 inch hatch with a 10 inch opening, for adding polymer prior to or during the fracture operation can be provided. To insure that the polymer slurry remains homogeneous, the polymer slurry tank 12 can be agitated by one or more paddles 14. These paddles can, for example, be operated hydraulically. Agitation may also be accomplished by circulating the polymer slurry through pipes (not shown) located in the tank 12.

The polymer slurry is pumped via a slurry pump 16, for example a hydraulically driven centrifugal pump. Examples of suitable slurry pumps include a 1½ inch×3 inch×10 inch centrifugal pump or an SB 1½ H "Sand Piper" pump manufactured by the Warren-Rupp Company. The flow rate from the pump can be controlled by a hydraulic valve. Preferably, the flow rate is measured using a mass flow rate meter 18.

The base liquid is preferably water and more preferably is a buffered aqueous solution containing, for example, about 2% KCl. Other salts can also be employed as buffering agents, for example, $NH_4Cl$, $NaCl$ or $CaCl_2$. The base liquid is held in one or more tanks 20 until it is combined with the polymer slurry. The mixture of polymer slurry and base liquid passes from suction pump and manifold 22 through flow meter 24 and fluid level control 26. The mixture pH can be adjusted at this point. The mixture is further dispersed by an in-line static mixing device 28 before entering into a first compartment 30. The intensity of mixing provided by the pump and manifold 22 and the in-line static mixing device 28 does not have to be very great. The purpose of the pump and manifold 22 and in-line mixer 28 is merely to disperse the polymer slurry in the base fluid.

The first compartment 30 comprises three chambers 32, 34 and 36. The three chambers 32, 34 and 36 are separated by baffles 33 and 35. The mixture passes through the three chambers 32, 34 and 36 of the first compartment 30 in essentially plug flow. The purpose of the first compartment is to provide a time interval between the time the polymer slurry and base liquid are combined at pump and manifold 22 and the time that the mixture enters into a recycle compartment 38. Preferably this time interval is equal to at least 45 seconds and more preferably is between about 45 and about 90 seconds.

The mixture of the polymer slurry and base liquid which is present in the recycle compartment 38 is subjected to high shear energy. A first portion of the mixture is withdrawn from recycle compartment 38 through inlet 52 of pipe 58 by centrifugal pump 50. After passing through centrifugal pump 50, the mixture continues through pipe 58, around in-line static mixing device 54 and discharges from outlet 56 into recycle compartment 38. The combination of the centrifugal pump 50, the in-line static mixing device 54 and the pipe 58 itself impart a high shear energy to the mixture passing therethrough.

A second portion of the mixture in recycle compartment 38 is withdrawn through pipes 60 and 62. Pipes 60 and 62 contain centrifugal pumps 64 and 66 and in-line mixers 68 and 70, respectively. These elements combine to impart a high shear to the second portion of the mixture withdrawn from recycle compartment 38. This second portion of the mixture is introduced into exit compartment 40. A substantially fully hydrated fracturing fluid can be withdrawn from exit compartment 40 through outlet 72.

In a preferred embodiment of the present invention, the centrifugal pumps 50, 64 and 66 are 8 inch×10 inch Crane-Deming centrifugal pumps or similar type pumps. These particular pumps are rated at 60 barrels per minute at 85% efficiency. While the rating is reduced at higher elevations, preferably the volumetric flow rate never falls below 50 barrels per minute. The pipes 58, 60 and 62 are preferably 8" diameter pipes that contain in-line static mixing devices 54, 68 and 70 that are approximately 2 feet long. In-line static mixing devices are available from, for example, Chemix and Lightnin.

In order to achieve substantially full hydration, a certain minimum shear energy must be supplied to the mixture. Preferably, the energy is at least 2, and more preferably from about 3 to 4 hydraulic horsepower for every barrel per minute of fracturing fluid exiting compartment 40 through outlet 72. As used herein, the term hydraulic horsepower shall be calculated according to the equation:

$$\text{Hydraulic horsepower} = \frac{\text{flow rate (in barrels per minute)} \times \text{pressure (in psi)}}{40.8}$$

In a preferred embodiment of the present apparatus the centrifugal pumps 50, 64 and 66 have a flow rate of from about 50 to about 70 barrels per minute and a pressure of from about 60 to 80 psi. Preferably, the flow rate of the fracturing fluid which is withdrawn from exit chamber 40 through outlet 72 is from about 60 to about 90 barrels per minute, and more preferably about 75 to about 85 barrels per minute. The total volume of the first compartment 30, the recycle compartment 38 and the exit compartment 40 is preferably from about 200 to about 250 barrels.

Minimum shear energy imparted to the mixture by the combination of pipes 58, 60 and 62; centrifugal pumps 50, 64 and 66 and static mixing devices 54, 68 and 70, is equal to at least about 2 hydraulic horsepower for each barrel per minute of fluid withdrawn from chamber 40 through outlet 72. Preferably the shear energy input rate is from 3 to 4 hydraulic horsepower per barrel per minute. At rates of less than two hydraulic horsepower per minute, the energy is typically insufficient to achieve substantially full hydration. As the energy increases, the hydration rate increases. However, at rates over 5 hydraulic horsepower per barrel per minute, the excess energy required to drive the centrifugal pumps is typically not worth the relatively small increases in hydration rate.

Alternatively, the shear energy can be applied to the mixture by devices other than centrifugal pumps and in-line static mixing devices. For example, paddle mixers can be employed. As used herein, the term "paddle mixers" will include blade type blenders, dispersators, propeller mixers, etc.

Compartment 40 includes an outlet 72 for the removal of the substantially fully hydrated fracturing fluid. With two pumps pumping fluid into compartment 40 at the rate of 55 barrels per minute each, it is possible to withdraw fluid from compartment 40 at a rate of 110 barrels per minute. However, the fracturing fluid is typically drawn off at a rate of approximately 85 barrels per minute or less. Excess fluid can flow over wall 37 into recycle compartment 38. After removal from exit compartment 40, additional items can be blended into the fluid, such as proppants and cross-linking agents, before it is pumped into a well.

It is contemplated that the hydration of the fluid is substantially complete upon the removal from exit compartment 40. The time necessary to substantially fully hydrate the polymer is preferably less than 3.5 minutes, more preferably less than 3 minutes and most preferably less than 2.5 minutes.

The invention has been described in detail with particular reference to preferred embodiments thereof, but it would be understood that variations and modifications can be effected within the spirit and scope of the invention as described hereinabove and as defined in the appended claims.

What is claimed is:

1. A method for hydrating a polymer comprising the steps of:
   (a) providing a polymer slurry;
   (b) providing a base liquid;
   (c) mixing said polymer slurry with said base liquid;
   (d) introducing the mixture of said polymer slurry and said base liquid into a first compartment;
   (e) removing said mixture from said first compartment after an initial residence time and introducing same into a recycle compartment;
   (f) withdrawing a first portion of said mixture from said recycle compartment, applying high shear energy to said first portion and recycling said first portion into said recycle compartment; and
   (g) withdrawing a second portion of said mixture from said recycle compartment wherein said mixture comprises said first portion, applying a high shear energy to said second portion and introducing said second portion into an exit chamber, wherein said first and second high shear energies are sufficient to substantially fully hydrate said polymer.

2. The method of claim 1 wherein said applications of high shear energy are provided at least in part by centrifugal pumps, in-line static mixing devices, paddle mixers or combinations thereof.

3. The method of claim 1 wherein said applications of high shear energy are provided by a plurality of pumps, each having a flow rate of greater than 50 gallons per minute and providing a pressure of greater than 60 psi, in combination with in-line static mixing devices.

4. The method of claim 1 wherein the total high shear energy provided to said mixture is equal to at least two hydraulic horsepower for every barrel/minute of mixture withdrawn from said exit chamber.

5. The method of claim 1 wherein the total high shear energy provided to said mixture is from about 3 to about 4 hydraulic horsepower for every barrel/minute of mixture withdrawn from said exit chamber.

6. The method of claim wherein said first compartment comprises a plurality of chambers separated by baffles.

7. The method of claim 1 wherein the time interval between the mixing of said polymer slurry with said base liquid and the application of shear to said first portion of said mixture is at least about 45 seconds.

8. The method of claim 1 wherein the flow of said mixture through said first compartment is essentially plug flow.

9. The method of claim 1 wherein the polymer is slurried into a hydrocarbon-based fluid.

10. The method of claim 1 wherein the polymer is slurried into an aqueous-based fluid.

11. The method of claim 1 wherein the polymer is selected from the group consisting of xanthan gum, guar gum, hydroxypropyl guar, carboxymethylhydroxypropyl guar, hydroxyethylcellulose and combinations thereof.

12. The method of claim 1 wherein said base liquid comprises water.

13. The method of claim 1 wherein said base liquid comprises water and a buffer.

14. The method of claim 1 wherein said base liquid comprises water and a salt selected from the group consisting of KCl, NH$_4$Cl, CaCl$_2$ and NaCl.

15. The method of claim 1 wherein the pH of the mixture is monitored continuously.

16. The method of claim 1 wherein the temperature of the mixture is monitored continuously.

17. The method of claim 1 wherein the viscosity of the mixture is monitored continuously.

18. The method of claim 1 wherein the polymer slurry further comprises a surfactant and a suspension agent.

19. The method of claim 1 wherein the polymer slurry is substantially fully hydrated in less than about 3 minutes from the time of initial mixing.

20. The method of claim 1 wherein the pH of the mixture is between about 6.5 and 7.5 and the temperature is greater than about 55° F.

21. The method of claim 1 wherein the fluid is pumped down a well-head.

22. The method of claim 1 wherein said mixing step comprises:
   (a) introducing a stream of said polymer slurry into a stream of said base liquid, and
   (b) dispersing said polymer slurry in said base liquid.

23. The method as claimed in claim 22 wherein the dispersion is accomplished using a pump and in-line static mixing device.

24. A method for hydrating a polymer comprising the steps of:
   (a) providing a polymer slurry comprising a hydratable polymer dispersed in a hydrocarbon liquid;
   (b) providing an aqueous base liquid;
   (c) mixing said polymer slurry with said aqueous base liquid;
   (d) dispersing said polymer slurry in said aqueous base liquid using an in-line static mixing device;
   (e) introducing said mixture into a first compartment which comprises a plurality of chambers separated by baffles, each chamber except the first in fluid communication with a preceding chamber;
   (f) introducing said mixture after at least about 45 seconds from the time of initial mixing into a recycle compartment which is in fluid communication with an exit compartment;
   (g) withdrawing a first portion of said mixture from said recycle compartment, applying high shear energy to said first portion with a centrifugal pump and a mixer element, and recycling said first portion into said recycle compartment;
   (h) withdrawing a second portion of said mixture from said recycle compartment wherein said mixture comprises said first portion, applying a high shear energy to said second portion with a centrifugal pump and a mixer element, and a introducing said second portion into said exit compartment, wherein the combined first and second high shear energies are at least two hydraulic horsepower for every barrel/minute of mixture withdrawn from said exit chamber;

(i) removing said mixture from said exit compartment; and (j) adding proppants to said mixture and pumping it into a well.

25. A method for the fracturing of a subterranean formation comprising the steps of:

(a) providing a polymer slurry;

(b) providing a base liquid;

(c) combining said polymer slurry with said base liquid;

(d) dispersing the polymer slurry in the base liquid;

(e) maintaining the mixture in a first compartment for from about 45 to about 90 seconds;

(f) introducing liquid from said first compartment into a recycle compartment;

(g) removing a first portion of the mixture from the recycle compartment with a high shear pump;

(h) pumping the mixture back into the recycle compartment;

(i) removing a second portion of the mixture from said recycle compartment with a high shear pump;

(j) pumping the second portion of the mixture into an exit compartment;

(k) removing substantially fully hydrated mixture from said exit compartment;

(l) adding proppants to the substantially fully hydrated mixture; and (m) injecting said hydrated mixture into a subterranean formation under hydraulic pressure.

26. The method of claim 25 wherein the polymer is slurried into a hydrocarbon-based fluid.

27. The method of claim 25 wherein the polymer is selected from the group consisting of guar, hydroxypropyl guar, carboxymethylhydroxypropyl guar, and hydroxyethylcellulose and combinations thereof.

28. The method of claim 25 wherein the base liquid is selected from the group consisting of water, water and KCl, water and NH$_4$Cl, and water and NaCl.

29. The method of claim 25 wherein the dispersion in step (d) is imparted by a static mixing device.

30. The method of claim 25 wherein high shear energy is imparted to the mixture at least in part by a centrifugal pump and mixer element.

31. The method of claim 25 wherein the polymer mixture is substantially fully hydrated in less than about 3 minutes.

32. An apparatus effective for the hydration of polymer gels comprising:

(a) a first vessel for containing a polymer slurry;

(b) a second vessel for containing a base liquid;

(c) means to combine said polymer slurry with base liquid to form a mixture;

(d) a first compartment having a residence time of greater than about 45 seconds;

(e) a recycle compartment in fluid communication with said first compartment;

(f) means to withdraw a first portion of a fluid from said recycle compartment, impart high shear energy to the first portion and return the first portion to said recycle compartment;

(g) an exit compartment;

(h) means to withdraw a second portion of a fluid from said recycle compartment, impart high shear energy to the second portion and to introduce the second portion into said exit compartment, and (i) means for withdrawing fluid from said exit compartment.

33. The apparatus of claim 32 further comprising an in-line static mixing device to disperse said polymer slurry within said base liquid.

34. The apparatus of claim 32 further comprising a plurality of baffled chambers within said first compartment which impart essentially plug flow to the mixture.

35. The apparatus of claim 32 wherein the high shear is imparted by a plurality of centrifugal pumps.

36. The apparatus of claim 32 wherein the high shear is imparted by a plurality of centrifugal pumps in combination with a plurality of in-line static mixing devices.

37. An apparatus effective for the hydration of polymer-based fracturing fluids comprising:

(a) a first vessel for containing a polymer slurry;

(b) a second vessel for containing an aqueous base liquid;

(c) means to combine said polymer slurry with said aqueous base liquid to form a mixture;

(d) an in-line static mixing device to disperse said mixture;

(e) a first compartment comprising a plurality of chambers in fluid communication with each other, said first compartment having a residence time of at least about 45 seconds;

(f) a recycle compartment in fluid communication with said first compartment;

(g) means to withdraw a first portion of fluid from said recycle compartment and return the first portion to said recycle compartment, comprising a high shear pump in fluid communication with an in-line static mixing device;

(h) an exit compartment;

(i) means to withdraw a second portion of fluid from said recycle compartment and to introduce the second portion into said exit compartment, comprising a high shear pump and an in-line static mixing device, and (j) a means for withdrawing fluid from said exit compartment.

* * * * *